US010627900B2

United States Patent
Publicover et al.

(10) Patent No.: US 10,627,900 B2
(45) Date of Patent: Apr. 21, 2020

(54) EYE-SIGNAL AUGMENTED CONTROL

(71) Applicant: Google LLC, Mountain View, CA (US)

(72) Inventors: Nelson G. Publicover, Reno, NV (US); Lewis James Marggraff, Mountain View, CA (US); Spencer James Connaughton, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/897,536

(22) Filed: Feb. 15, 2018

(65) Prior Publication Data
US 2018/0275753 A1 Sep. 27, 2018

Related U.S. Application Data

(60) Provisional application No. 62/475,709, filed on Mar. 23, 2017.

(51) Int. Cl.
*G06F 3/01* (2006.01)
*G06K 9/00* (2006.01)
*G06F 3/0481* (2013.01)

(52) U.S. Cl.
CPC .......... *G06F 3/013* (2013.01); *G06F 3/04812* (2013.01); *G06K 9/00597* (2013.01); *G06K 9/00604* (2013.01)

(58) Field of Classification Search
CPC . G06F 3/013; G06F 3/04812; G06K 9/00597; G06K 9/00604
USPC ........................................... 345/157, 1.1–3.1
See application file for complete search history.

(56) References Cited

U.S. PATENT DOCUMENTS

| 6,637,883 B1* | 10/2003 | Tengshe ................ A61B 3/113 351/210 |
| 2002/0105553 A1* | 8/2002 | Segre ...................... G06F 3/023 715/862 |
| 2005/0116929 A1* | 6/2005 | Molander ............... G06F 3/013 345/157 |
| 2012/0272179 A1 | 10/2012 | Stafford |
| 2014/0208273 A1 | 7/2014 | Moffett |
| 2014/0247210 A1* | 9/2014 | Henderek ................ G06F 3/02 345/156 |

FOREIGN PATENT DOCUMENTS

WO 2017031089 2/2017

OTHER PUBLICATIONS

International Search Report and Written Opinion dated Jun. 13, 2018 for corresponding International Application No. PCT/US2018/023787; 13 pages.

* cited by examiner

*Primary Examiner* — Rodney Amadiz

(57) ABSTRACT

An electronic system tracks a user's gaze to rapidly transport a cursor to a location within a focal region of the user's eye. The electronic system transports the cursor from an initial location across one or more displays to a new location in response to detecting one or more saccadic and/or vergence movements of the user's eye or in response to a signal indicating that the user desires to move the cursor to a new location within a focal region of the user's eye or eyes. In some embodiments, the electronic system moves the cursor to the new location along a trajectory wherein the cursor is visible along at least a portion of the trajectory, enabling the user to find the cursor more easily.

21 Claims, 4 Drawing Sheets

EYE-SIGNAL AUGMENTED CONTROL

CROSS-REFERENCE TO RELATED APPLICATIONS

The present application is related to and claims priority to the following application, the entirety of which is incorporated by reference herein: U.S. Provisional Patent Application Ser. No. 62/475,709, entitled "Systems and Methods for Biomechanically-Based Eye Signals for Interacting with Real and Virtual Objects."

BACKGROUND

Field of the Disclosure

The present disclosure relates generally to imagery capture, processing and display; and more particularly to manipulating displays based on captured imagery.

Description of the Related Art

A cursor or pointer indicates a position on a display at which text may be entered or deleted, or other manipulations of displayed marks or information may be effected. Computer mice, trackpads, joysticks, and other manual tracking devices specify positional information of a cursor or pointer during human-machine interactions. For example, by manipulating a computer mouse or trackpad, a user can specify where on a display to place a cursor or pointer. However, when working with large displays or multiple displays, it may be difficult or time-consuming for a user to locate the cursor or pointer, or to move the cursor or pointer to a desired location at a display.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
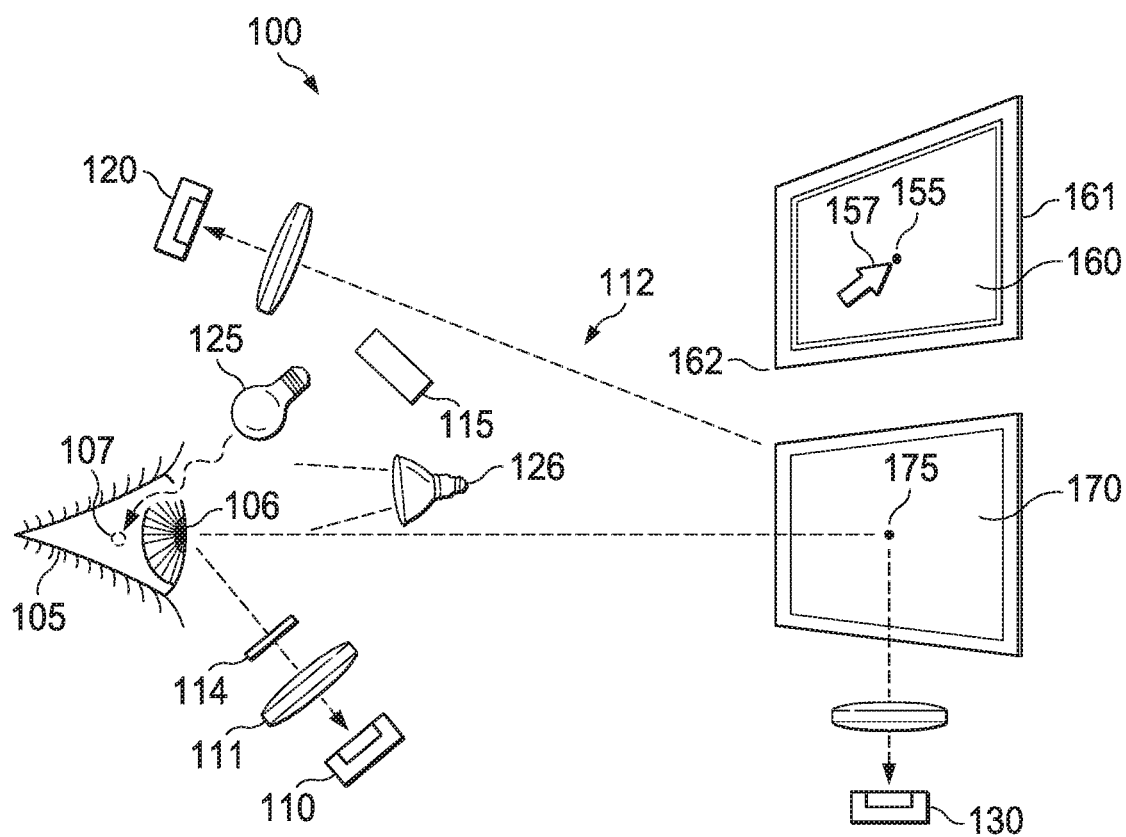
FIG. 1 is a diagram illustrating an electronic system configured to track a gaze of a user's eye and a location of a cursor at a display, and to automatically move the cursor to a location within a focal area of the user's eye in accordance with at least one embodiment of the present disclosure.

The following description is intended to convey a thorough understanding of the present disclosure by providing a number of specific embodiments and details involving locating a cursor on a display and moving the cursor to a location within a focal region of a user's eye or eyes based on the gaze of a user's eye or eyes. A "cursor" refers to a pointer or other indicator signifying a location at a display at which changes to the display may be effected by input from a user, such as showing where typed text will be entered. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-6 illustrate various techniques for employing an electronic system to move a cursor from a first location at a display to a second location, such as a second location within the same display or a different display, wherein the second location is within a focal region of the gaze of a user's eye or eyes. For example, a cursor may be projected by a processor onto a display at a location and with motions known to the processor. Alternatively, a scene camera of the electronic device may track the location of a cursor with respect to one or more displays and the user's gaze. A processor of the electronic device receives images from the scene camera and determines, based on the images, a position and motion of the cursor with respect to the user's gaze and the one or more displays.

One or more user-facing detectors (e.g., one or more cameras) capture images of a user's eye or eyes, and provides the images of the user's eye or eyes to the processor, which determines a gaze direction and focal point of the user based on the eye images. The processor receives signals based on an input device (e.g. voice commands, a computer mouse, trackpad, touchpad, joystick, keyboard, or other input device) indicating that the user desires to move the cursor to a second location. In alternative embodiments, the processor detects a saccadic or vergence movement of the user's eye, indicating that the user desires to move the cursor to a second location at a focal region of the user's eye or eyes following the saccadic or vergence movement. In response to the signal, and/or in response to a saccadic or vergence movement of the user's eye, as indicated by the captured images of the user's eye, the processor rapidly moves the cursor to a second location within a focal region of the user's eye along a trajectory, wherein the cursor may be visible as it moves along at least a portion of the trajectory. Thus, the electronic device moves the cursor from a first location at a first display to a second location at the first display or at a second display along a trajectory in response to the user's eye focusing on the second location or another signal. By tracking a user's gaze, the electronic device can rapidly transport the cursor (i.e., essentially instantaneously, or accelerating, "jumping", and decelerating) across long distances and across one or more displays in response to one or more saccadic and/or vergence movements of the user's eye and/or a signal indicating that the user desires to move the cursor to a location within a focal region of the user's eye or eyes. By moving the cursor to the second location along a trajectory wherein the cursor is visible along at least a portion of the trajectory, the electronic device enables the user to find the cursor more easily, thus improving the user experience.

FIG. 1 illustrates an electronic system 100 configured to move a cursor 155 from a first location 157 at a display 160 to a second location 175 within a focal region of the gaze of a user's eye 105 at the same display or at a different display along a trajectory wherein the cursor is visible along at least a portion of the trajectory in accordance with at least one embodiment of the present disclosure. The electronic system 100 can include a user-portable mobile device, such as a tablet computer, computing-enabled cellular phone (e.g., a "smartphone"), a head-mounted display (HMD), a notebook computer, a personal digital assistant (PDA), a gaming system remote, a television remote, and the like. In other embodiments, the electronic system 100 can include another type of mobile device, such as an automobile, robot, remote-controlled drone or other airborne device, and the like. For ease of illustration, the electronic system 100 is generally described herein in the example context of a mobile device, such as a tablet computer, HMD, smart watch, or a smartphone; however, the electronic system 100 is not limited to these example implementations. In the depicted example, the system 100 includes a processing unit (not shown), at least one scene camera 120, at least one user-facing camera or detector 110, a depth sensor 115, at least one illumination source 125, a first display 160, and a second display 170.

The electronic system 100 includes a plurality of sensors to obtain information regarding a local environment 112 of the electronic system 100. The electronic system 100 obtains visual information (imagery) for the local environment 112 via a scene camera 120, and a depth sensor 115. In some embodiments, the scene camera 120 and the depth sensor 115 are disposed at a forward-facing surface of a HMD or eyeglasses, and the user-facing camera or detector 110 is disposed at a user-facing surface of the HMD or eyeglasses. In one embodiment, the scene camera 120 is implemented as a wide-angle imaging sensor having a fish-eye lens or other wide-angle lens to provide a wider-angle view of the local environment 112 facing the first display 160 and the second display 170.

In some embodiments, the electronic system 100 includes a second scene camera 130, implemented as a narrow-angle imaging sensor having a typical angle of view lens to provide a narrower angle view of the local environment 112 facing the first display 160 and the second display 170. Accordingly, the scene camera 120 and the second scene camera 130 are also referred to herein as the "wide-angle scene camera 120" and the "narrow-angle scene camera 130," respectively. As described in greater detail below, the wide-angle scene camera 120 and the narrow-angle scene camera 130 can be positioned and oriented on the forward-facing surface of the HMD or eyeglasses such that their fields of view overlap starting at a specified distance from the HMD or eyeglasses, thereby enabling depth sensing of objects in the local environment 112 that are positioned in the region of overlapping fields of view via image analysis. The user-facing camera 110 can be used to capture image data of at least one eye 105 of a user.

The depth sensor 115, in one embodiment, uses a modulated light projector 126 to project modulated light patterns from the forward-facing surface of the HMD or eyeglasses into the local environment 112, and uses one or both of scene cameras 120 and 130 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 115 then may calculate the depths of the objects, that is, the distances of the objects from the HMD or eyeglasses, based on the analysis of the depth imagery. The resulting depth data obtained from the depth sensor 115 may be used to calibrate or otherwise augment depth information obtained from image analysis (e.g., stereoscopic analysis based on parallax) of the image data captured by the scene cameras 120 and 130. Alternatively, the depth data from the depth sensor 115 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic system 100 senses that it is outdoors or otherwise in relatively good lighting conditions, the electronic system 100 may elect to use multiview-based reconstruction to determine object depths. Conversely, when the electronic system 100 senses that it is indoors or otherwise in relatively poor lighting conditions, the electronic system 100 may switch to using modulated light-based depth sensing via the depth sensor 115.

In some embodiments, one or both of the first display 160 and the second display 170 is a physical surface, such as a tablet, mobile phone, smart device, display monitor, array(s) of display monitors, laptop, signage and the like or a projection onto a physical surface. In some embodiments, one or both of the first display 160 and the second display 170 is planar. In some embodiments, one or both of the first display 160 and the second display 170 is curved. In some embodiments, one or both of the first display 160 and the second display 170 is a virtual surface, such as a three-dimensional or holographic projection of objects in space including virtual reality and augmented reality. In some embodiments in which one or both of the first display 160 and the second display 170 is a virtual surface, the virtual surface is displayed within an HMD of a user. The location of the virtual surface may be relative to stationary objects (such as walls or furniture) within the local environment 112 of the user.

The electronic system 100 controls movement of the cursor 155 among the displays using one or more processor platforms within the displays and communication protocols such as Bluetooth, WiFi, and/or other forms of mobile communications. In exemplary embodiments, eye tracking as well as the display regions of the starting cursor location, one or more display devices along the trajectory of the cursor and display at the desired cursor location may each be controlled by separate processors. In such cases, communication protocols (e.g., Bluetooth, WiFi) may be used among processors to share gaze vectors, cursor locations, user controls, reference locations, timing information and other data to enable appropriate display and movement of the cursor.

In some embodiments, the scene cameras 120 and 130 may determine reference locations relative to the cursor 155 within the first display 160 and the second display 170. For example, reference locations on the first display 160 may include the edges 161 and/or corners 162 of the first display 160, marks on the first display 160, recognizable objects attached or affixed to the first display 160, visible or invisible light-emitting devices (e.g., light-emitting diodes) incorporated within or around the first display 160, and/or one or more displayed objects.

The user-facing camera or detector 110 is configured to detect a gaze direction and focus of a user's eye 105 or eyes. In some embodiments, the user-facing camera or detector 110 may be a CMOS (complementary metal oxide) or CCD (charge-coupled device) detector. By tracking and classifying eye movements, the electronic system 100 can discern the user's intent. In at least one embodiment, the electronic system 100 tracks one or more of the following types of eye movements: 1) vestibulo-ocular, 2) vergence, 3) smooth pursuit, and 4) saccadic. The electronic system 100 can distinguish different types of movements based on parameters such as range of motion, velocity profile, whether both eyes perform conjugate (versus dissimilar direction) movements, and whether the head or visual field is also moving. During the process of discerning eye signals, the voluntary movements of the eye can be analyzed by the electronic system 100 to identify the conscious intent of the user of the electronic system 100.

For example, saccadic eye movements are rapid movements that abruptly change the fixation point of the eye. Saccades are "ballistic" in the sense that, once initiated, the direction and distance covered by the saccade are governed solely by the saccadic launch. In other words, no mid-course corrections are generally possible during a saccade, even if the position of a target changes during the time of saccadic initiation and/or its execution. A saccade is the fastest muscular movement produced by the human body, reaching angular velocities up to 900°/second. A saccade is also "ballistic" in terms of its velocity profile. In response to an unanticipated stimulus, the initiation portion of a saccade takes about 200 milliseconds. Initiation leads to a phase of rapid acceleration where (similar to other ballistic velocity profiles) peak velocity is approximately proportional to the distance to be traveled. The movement phase of a saccade lasts from 20 to 200 milliseconds, depending on the total angular distance traveled. Normally, as long as the head remains motionless, saccades do not rotate the eye in a torsional axis (i.e., so-called Listing's Law). Saccades greater than approximately 20° are frequently accompanied by head movement, although this varies widely from individual to individual and also varies as a function of age.

There is a rapid deceleration phase as the direction of sight lands on the new target location. Following a very short delay, large saccades are frequently accompanied by at least one smaller corrective saccade to further approach a target location. Corrective saccades can occur even if the target has been made to disappear, further supporting the projected, ballistic nature of saccadic movements. However, corrective saccades are more frequent if the target remains visible. Thus, in at least one embodiment, the electronic system 100 can detect saccades, including corrective saccades, to identify the likely intent of the user.

The most common types of eye movements that can be performed directly or indirectly under voluntary control are: 1) saccades, 2) smooth pursuit, 3) vergence, and 4) vestibulo-ocular. Using eye position data determined from a series of eye images captured by the user-facing camera 110, algorithmic "filters" can be applied by the electronic system 100 to identify and distinguish, in real-time, the presence of saccadic or vestibular eye movements in particular. For example, in one embodiment the electronic system 100 can employ a saccadic filter. The saccadic filter relies primarily on the fact that saccades are rapid. In fact, as mentioned previously, saccades are the most rapid movements in the human body with angular velocities up to 900° per second. The saccadic velocity profile is ballistic, where (up to displacements of about 60°) peak velocity is approximately a linear function of distance traveled. For example, a 10° saccade has an angular velocity of roughly 300° per second whereas peak angular velocity for a 30° displacement is roughly 500° per second. An aspect of implementing eye signals based on saccades within the systems and methods herein is the ability to unambiguously couple or connect virtual or real objects located at two positions (i.e., the saccadic launch position and the saccadic landing position) anywhere within an observer's field-of-view without interference by objects along the visual pathway between the two positions. By performing a series of saccades, any number of objects or positions can be logically connected under voluntary user control to discern intent.

Saccadic movements are an order of magnitude faster than the fastest motions associated with smooth pursuit. This velocity difference is a key distinction within a filter to distinguish, for example, smooth pursuit eye movements. The overall direction and speed of a smooth-pursuit eye movement must also match the velocity profile of the object that is under observation (unless the observer has received extensive training to avoid this). Thus, the electronic system 100 can distinguish smooth pursuit from saccades based on velocity, and from other eye movements (e.g., vergence and vestibulo-ocular movements) based on whether a match exists compared to the velocity profiles of displayed or real objects.

More specifically, when viewing slowly moving objects, a smooth pursuit can be recognized by close following of the object after a latency of approximately 100 msec. Smooth pursuit is generally recognized at angular velocities less that about 30° per second; although somewhat higher velocities may occur, particularly in the horizontal direction. At object movement velocities greater than those that can be followed by smooth pursuit, so-called "catch-up saccades" are used by humans to track objects in the environment. The electronic system 100 can distinguish a saccade-fixation sequence from smooth pursuit based on overall velocity as well as the start/stop velocity profile of saccadic sequences.

In some embodiments, the electronic system 100 implements a smooth pursuit filter configured to determine when a user is voluntarily following a specific object. By assigning meaning or purpose to different objects that can move about, the electronic system 100 can identify user intent by measuring which object (if any) is being followed. In at least one embodiment, the electronic system 100 selects 1-of-N states (or the absence of tracking any object) if there are N "trackable" objects moving about as indicated by the captured imagery.

As described above, a key characteristic that can be used to identify (i.e., algorithmically filter) vergence eye movement is the divergent or dissimilar movement of one eye relative to the other. Vergence eye movements are also generally slower than saccadic movements. Physiologically, vergence eye movements maintain a single binocular vision when viewing objects at differing distances. When identified, vergence eye movements may be used to control the radial distance (i.e., depth) of a target cursor site. The apparent distance of a displayed cursor may be controlled by visual cues including cursor size, light field vectors and/or being partially obscured by other objects located at various radial distances in the device user's field-of-view. Transporting a cursor in the third (i.e. radial) dimension using vergence or by knowing the distance of an object being pointed to (as described above) can be an intuitive method of 3-dimensional cursor control.

The electronic system 100 discerns eye gaze based on any one of or a combination of pupil data, glint data or iris data. For example, a pupil may be visible and generating a stable edge, the correct number of well-spaced corneal glints may be produced by the system's illumination circuit, a limbus may be detected and its diameter within range of a population average, and/or an iris may be visible with enough information that its pose can be determined. The one or more user-facing cameras or detectors 110 are configured to work in conjunction with one or more illumination sources 125. The illumination sources 125 may include one or more light emitting diodes (LEDs) to provide general illumination and/or illumination that produces reference "glints" 106 on the surface of the eye 105. In some embodiments, the illumination source(s) 125 utilize invisible (e.g., near infrared) light to avoid distracting the user and still be detectable by a CMOS or CCD detector. The one or more glints 107 provide reference directions or vectors to aid in computing gaze directions using techniques that are known in the art. In some embodiments, the user-facing camera or detector 110 includes one or more lenses 111 and may include one or more optical filters 114 to block stray or ambient light, (e.g., unwanted light coupled to the detector).

To facilitate moving a cursor 155 along a trajectory from a first location 157 at a first display 160 to a second location 175 within a focal region of the gaze of a user's eye, either at the first display 160 or at a second display 170, the user-facing camera 110 acquires images of the eye 105, including structures of the eye, such as the pupil 106, iris, and glints (i.e., reflections of light off the cornea) 107. In some embodiments, the electronic system 100 uses glints in conjunction with known locations of the illumination sources 125 (producing glint vectors) and the user-facing camera 110 to determine a relative gaze direction of the eye 105. By filtering for saccadic and other forms of eye movements, the electronic system 100 can determine whether the user's eye 105 is focused on a location at the first display 160 or the second display 170.

During operation, cursor position and movement may be known to at least one processor. Alternatively, scene cameras 120 and 130 capture images of the environment 112 of the user, including images of the cursor 155 and/or the first and second displays 160, 170. In those embodiments in which one or both of the first display 160 and the second display 170 is a virtual surface, the scene cameras 120 and 130 capture images of the cursor 155 in relation to virtual surfaces, whose coordinates are known to the electronic system 100. A processing unit (not shown) of the electronic system 100 may use the captured imagery from the scene cameras 120 and 130 and/or depth data from the depth sensor 115 to determine a distance from the cursor 155 to a display surface 160 or real object in the direction of (in front of, or behind) the target cursor location. The one or more user-facing cameras 110 capture images of at least one eye 105 of the user. The processing unit (not shown) of the electronic system 100 uses the captured imagery of the user's eye 105 to determine, based on pupil tracking, glints and/or iris tracking, whether the user's eye 105 is focused on a location more than a threshold distance from the location of the cursor 155.

In response to detecting that the user's eye is focused at the second location 175 following a saccadic or vergence movement or movement of the cursor generally in the direction of the user's gaze by a mouse, trackball, joystick, or other control device (referred to as a "cursor control device"), and that the second location 175 is more than a threshold distance from the first location 157 at which the cursor 155 is located, the electronic system 100 transports the cursor 155 along a trajectory from the first location 157 to the second location 175. In some embodiments, the trajectory is a vector (straight line), and in some embodiments, the trajectory may not be in a straight line, such as in the form of an arc. In some embodiments, the trajectory of the cursor may involve movement in the radial direction (i.e., toward or away from the user). In some embodiments, the electronic system 100 transports the cursor 155 to the gaze location 175 in response to the cursor control device moving the cursor 155 more than a threshold distance toward the gaze location 175.

In some embodiments, the electronic system 100 moves the cursor 155 substantially instantaneously (i.e., "jumps") to the region of the gaze location 175. In some embodiments, following a substantially instantaneous transport of the cursor 155 from the first location 157 to the second location 175 within the foveal view of the user, the cursor 155 re-appears moving along a vector from the first location 157 moving toward the gaze location (second location 175) of the user. Once the cursor 155 re-appears within the foveal view of the user, the electronic system 100 passes control of the cursor 155 from an eye-tracking subsystem to a cursor device, such as a mouse or trackpad. Thus, the electronic system 100 uses eye-control to rapidly transport a cursor over large distances while maintaining precision control of a cursor using a pointing device. In some embodiments, the electronic system 100 additionally uses eye-control to position a cursor in 3-dimensional space even when a pointing device contains only 2 degrees of freedom (e.g., horizontal and vertical movements).

In some embodiments, the electronic system 100 alters the sensitivity, or spatial gain, of the cursor control device in response to detecting that the user's eye 105 is focused at a location more than a threshold distance from the cursor 155. Thus, the electronic system 100 adjusts the spatial gain, or relation between movement or signaling of the cursor control device and the proportional distance covered by the cursor 155, such that the cursor 155 moves with greater velocity for a given cursor control device movement or other input the further the cursor 155 is located from the gaze location. In some embodiments, the electronic system 100 accelerates movement of the cursor 155 at the beginning of a transport to a second location, and decelerates the cursor 155 as the cursor approaches the second location.

In some embodiments, the electronic system 100 initiates transporting the cursor 155 to the second location 175 in response to a signal from the user, such as a verbal signal, gesture or movement (e.g., by a finger, arm, mouth, foot, lips), or a signal received from an input/output device such as a switch, computer mouse, trackball, or digital pen. The electronic system 100 is programmed to respond to a variety of inputs (i.e., gestures, movements, sound activation, specific words uttered, blink duration) and thresholds (e.g., distance between the first location and a gaze location) to initiate transporting the cursor 155. For example, gestures and signals to indicate that rapid movement of the cursor 155 toward the gaze location is desired include movement exceeding a threshold velocity, shaking the cursor control device, patterns of movement of the cursor control device (such as circular, or movement in a fixed direction), a button press, blinking, shaking one's head, etc. In some embodiments, if the cursor 155 is within a specified threshold distance from the gaze location 175, the electronic system 100 suppresses the transport functionality.

In some embodiments, the electronic system 100 transports displayed information associated with the cursor 155 when the electronic system 100 transports the cursor 155. For example, if the cursor 155 is associated, or "pinned", to an image, icon, or section of text at the first display 160, the electronic system 100 transports the image, icon, or text, and associated information, with the cursor 155 to the second location. The second location may be positioned on the first display or on a second display 170. In this way, the electronic system 100 can rapidly transport images, video, text, numbers, files, applications, and specific functions that are performed by applications from one device and/or location to another. Such locations may, in turn, determine processor functions. More than one processor may be involved when a cursor is transported from the first display 160 to a second display 170 in response to determining that the user's gaze is focused at the second display 170. Transport of the cursor 155 and/or associations assigned to the cursor 155 allows the user to more efficiently find the cursor 155 and access functionality of multiple platforms across multiple displays.

Figure 2:
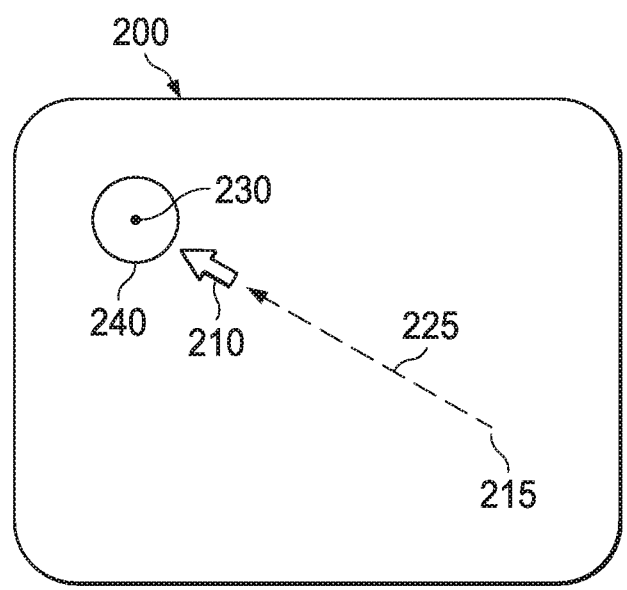
FIG. 2 is a diagram illustrating an embodiment of the electronic system of FIG. 1 in which the cursor moves along a trajectory from a first location to a second location within a focal area of the user's eye in accordance with at least one embodiment of the present disclosure.

FIG. 2 illustrates an embodiment of the electronic system 100 of FIG. 1 in which a cursor 210 moves along a straight-line trajectory 225 from a first location 215 at a display 200 to a second location 230 at the display 200 within a focal area 240 of the user's eye (not shown) in accordance with at least one embodiment of the present disclosure. A cursor control device (not shown), such as a mouse, trackball, touchpad, or joystick, controls movement of the cursor 210. In response to determining that the user's gaze is focused at a focal area 240 that is more than a threshold distance from the first cursor location 215, and in response to the cursor control device moving the cursor 210 generally in the direction of the focal area 240, the electronic system 100 moves the cursor 210 essentially instantaneously along the trajectory 225 from the first location 215 to the second location 230 within the focal area 240. In some embodiments, the cursor 210 reappears moving along a general path of the trajectory 225 from the first location 215 to the second location 230.

In some embodiments, as the cursor 210 approaches the second location 230, the electronic system 100 returns control of the cursor 210 to the cursor control device. In some embodiments, the electronic system 100 adjusts the sensitivity, or gain, or the cursor control device upon reappearance of the cursor 155 such that the cursor location can be manipulated with high precision using one or more cursor control devices. In this way, with minimal eye movement, the electronic system 100 rapidly transports the cursor 210 across a large distance between the first location 215 and the second location 230, while maintaining high precision control.

Figure 3:
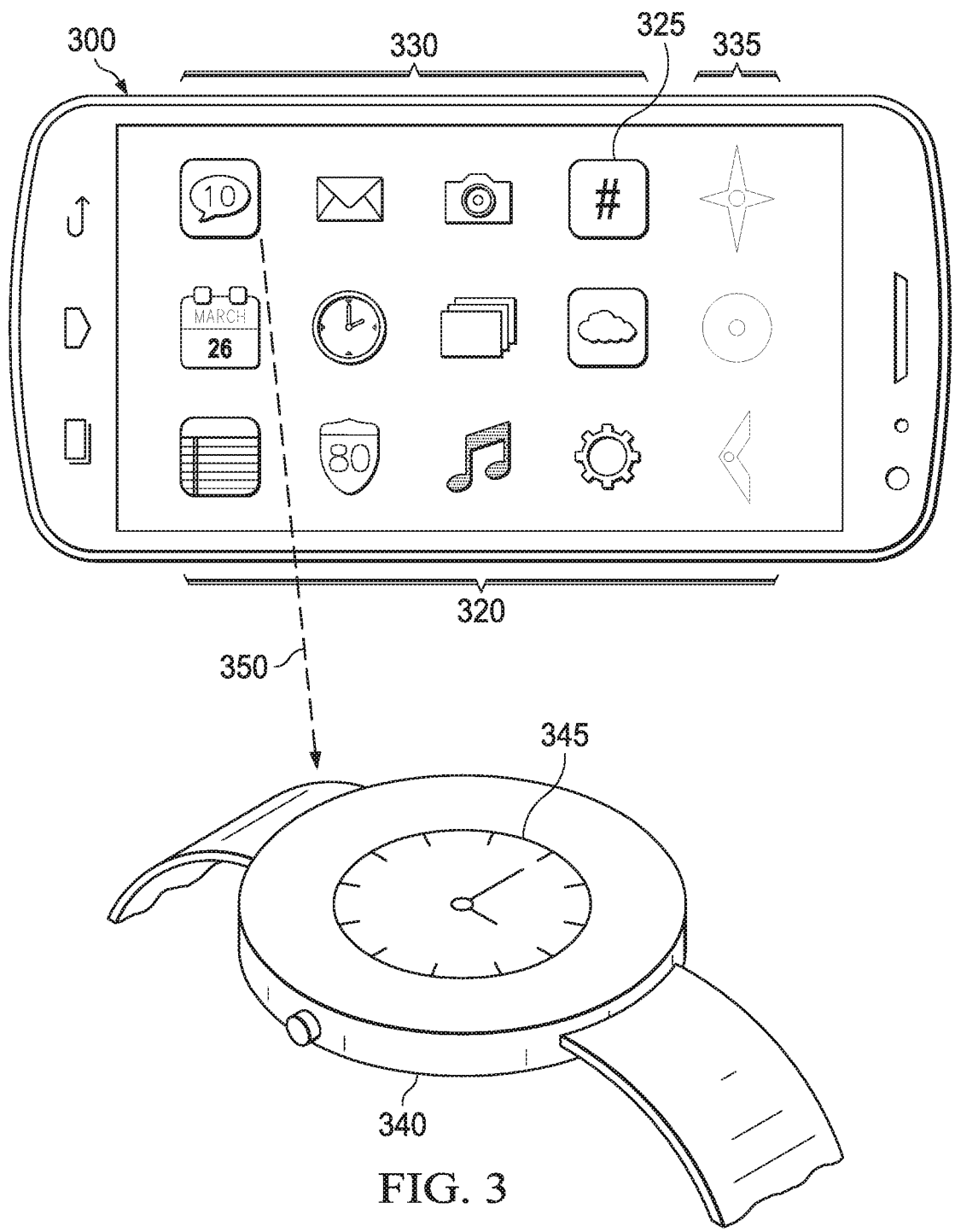
FIG. 3 is a diagram illustrating an embodiment of the electronic system of FIG. 1 in which an icon moves along a trajectory from a first location at a first display to a second location within a focal area of the user's eye at a second display in accordance with at least one embodiment of the present disclosure.

FIG. 3 illustrates an embodiment of the electronic system 100 of FIG. 1 in which an icon 325 moves along a trajectory 350 from a first location at a first display region 320 of a mobile device 300 to a second location within a focal area of the user's eye at a second display 340 in accordance with at least one embodiment of the present disclosure. In the example of FIG. 3, the electronic system 100 transports a function associated with the icon 325 across platforms from a display region 320 of a mobile device 300 such as a smart phone or tablet to a smart watch 340 displaying a clock 345.

The display region 320 of the mobile device 300 includes a plurality of icons 330 that represent various functions. The display region 320 further includes a column 335 of activation icons that can be selected through an eye-signal language. A user can manipulate the display region 320 using any combination of touch, eye signals, voice commands using a microphone, and the like to perform desired functions. In the example of FIG. 3, the electronic system 100 transports an icon 325 representing text messages and associated functionality from the mobile device 300 to the smart watch 340 in response to a transport initiation signal and detecting one or more saccadic and/or vergence eye movements traversing the distance between the mobile device 300 and the smart watch 340. The transport initiation signal is a signal indicating that transport of the icon 325 is desired, such as eye signaling, touching the display region 320, voice, or other input modalities. In some embodiments, the electronic system 100 provides graphical feedback at the smart watch 340, or other receiving device, indicating that transport of the icon 325 is occurring, such as the icon 325 sweeping in the direction of the detected eye movement(s) toward the center of the smart watch 340.

Figure 4:
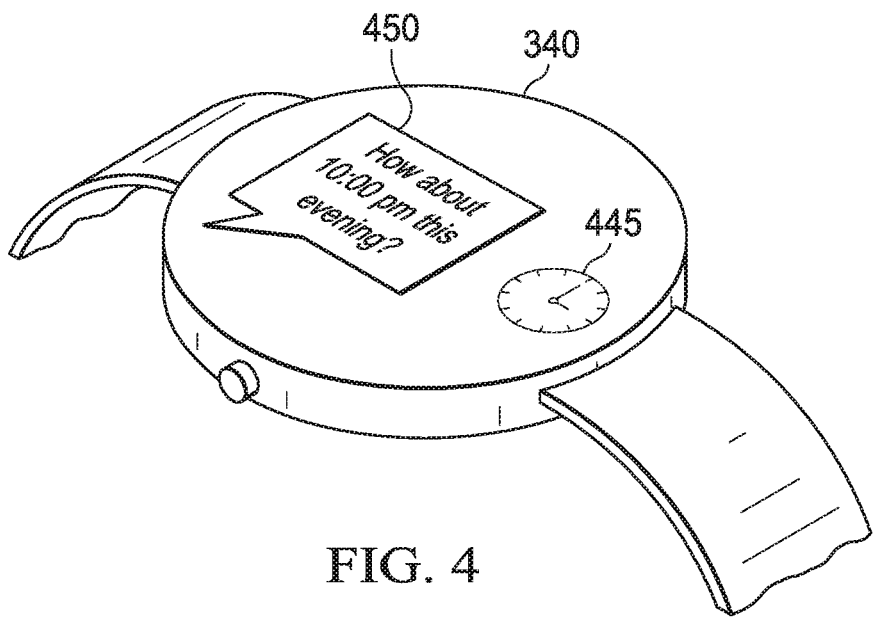
FIG. 4 is a diagram illustrating an embodiment of the electronic system of FIG. 1 in which a text message associated with the icon illustrated in FIG. 3 appears at the second location at the second display in accordance with at least one embodiment of the present disclosure.

FIG. 4 illustrates an embodiment of the electronic system 100 of FIG. 1 in which a text message 450 associated with the icon 325 illustrated in FIG. 3 appears at the second location at the second display 440 in accordance with at least one embodiment of the present disclosure. The functionality associated with the text messaging icon 325 that was transported to the smart watch 340 from the mobile device 300 is also transported to the smart watch 340. In the example of FIG. 4, the clock 345 that had been displayed in a large format on the smart watch 340 in FIG. 3 is minimized 445 to make room for text messages 450 to be displayed on the smart watch 340. The transported functionality of the text messaging icon 325 of FIG. 3 can be manipulated using eye signals and other inputs.

Figure 5A:
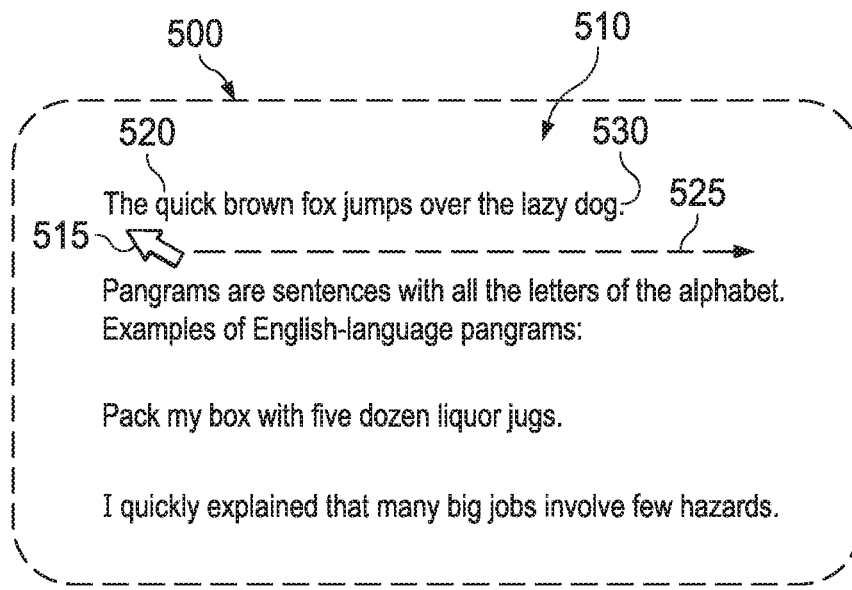
FIG. 5A is a diagram illustrating an embodiment of the electronic system of FIG. 1 in which the electronic system selects a portion of text appearing at a first location at a display in response to tracking the gaze of a user's eye accordance with at least one embodiment of the present disclosure.

FIG. 5A illustrates an embodiment of the electronic system 100 of FIG. 1 in which the electronic system 100 selects a portion of text 520 appearing at a first location at a display 500 in response to tracking the gaze of a user's eye accordance with at least one embodiment of the present disclosure. Display 500 displays a document 510 containing a body of text. In the example of FIG. 5A, the user wishes to move the first sentence of text 520 to a location further down in the document 510. The electronic system 100 responds to any combination of eye signals and multi-modal (e.g., mouse, trackpad, voice control) inputs to move a cursor 515 to the beginning of the sentence 520 where the selected text is specified. Responding to the user gazing at a region near the end 530 of the sentence 520, the electronic system 100 transports the cursor 515 along a trajectory 525 toward the end 530 of the sentence 520. In some embodiments, the electronic system 100 transports the cursor 515 toward the gaze direction instantaneously or at high velocity. In some embodiments, the electronic system 100 slows the cursor 515 as it approaches the gaze location.

Figure 5B:
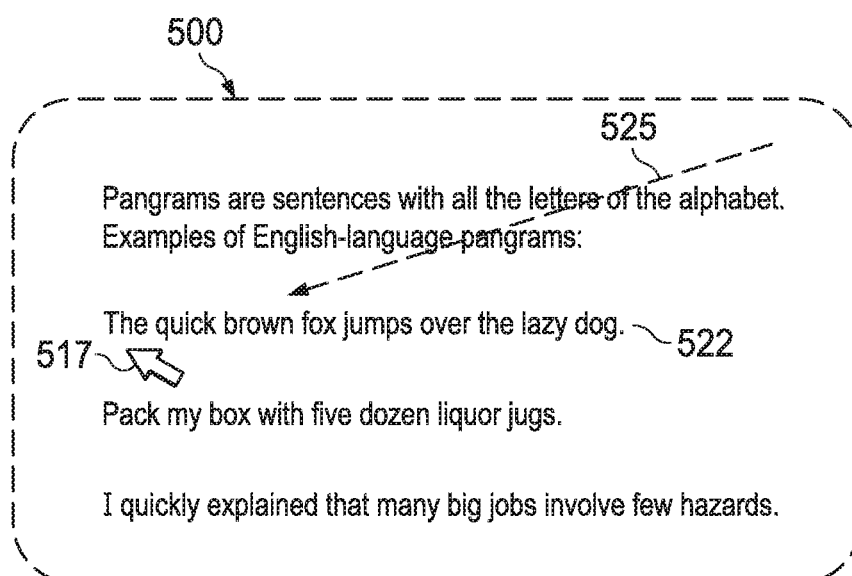
FIG. 5B is a diagram illustrating an embodiment of the electronic system of FIG. 1 in which the electronic system moves the portion of text selected in FIG. 5A to a second location in response to tracking the gaze of the user's eye in accordance with at least one embodiment of the present disclosure.

FIG. 5B illustrates an embodiment of the electronic system 100 of FIG. 1 in which the electronic system 100 moves the portion of text 520 selected in FIG. 5A to a second location 517 in response to tracking the gaze of the user's eye in accordance with at least one embodiment of the present disclosure. After the user has specified the end of the selected text using one or more input modalities, in response to detecting a saccade or vergence eye movement 525 to the second location 517, the electronic system 100 transports the selected text 522 to the second location 517. In some embodiments, the electronic system 100 accepts multimodal inputs to precisely guide the selected text 522 to the second location 517.

Figure 6:
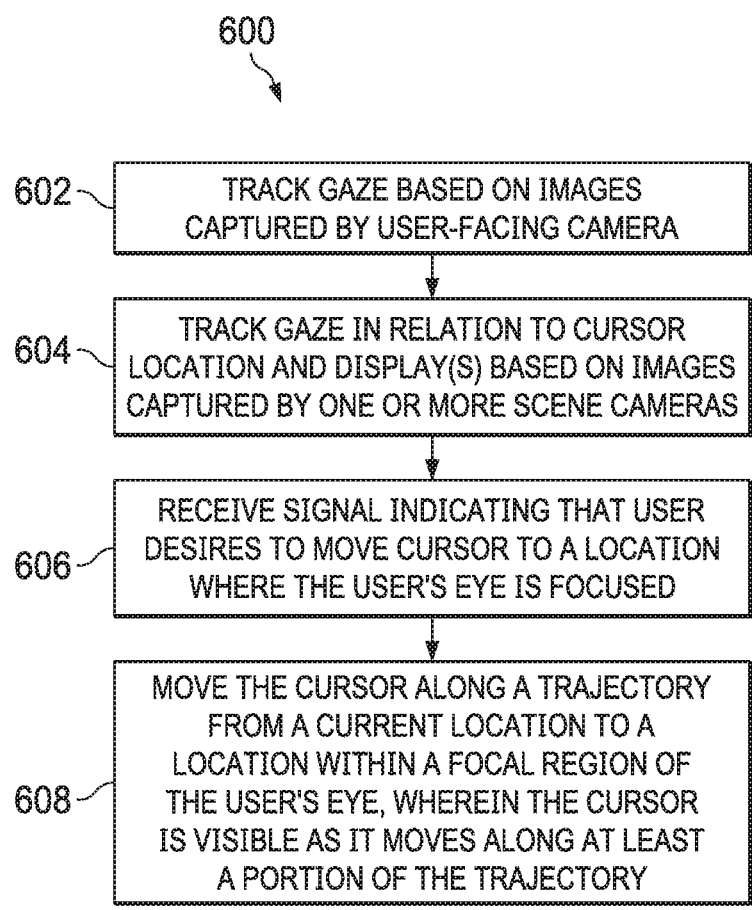
FIG. 6 is a flow diagram illustrating an operation of the electronic system of FIG. 1 to track the gaze of a user's eye and the location of a cursor, and to move the cursor along a trajectory to a location within a focal region of the user's eye in accordance with at least one embodiment of the present disclosure.

FIG. 6 is a flow diagram illustrating an operation 600 of the electronic system 100 of FIG. 1 to track the gaze of a user's eye and the location of a cursor, and to move the cursor along a trajectory to a location within a focal region of the user's eye in accordance with at least one embodiment of the present disclosure. At step 602, the electronic system 100 tracks the position of the user's eye based on images captured by the user facing camera 110. At step 604, the electronic system 100 computes the user's gaze with respect to the cursor 155 and/or the displays 160, 170. At step 606, the electronic system 100 receives a signal indicating that the user desires to move the cursor 155 to a second location where the user's eye is focused. In some embodiments, the electronic system 100 determines that the second location is more than a threshold distance from the current location of the cursor 155. At step 608, the electronic system 100 moves the cursor along a trajectory from the current (first) location to the second location within a focal region of the user's gaze. In some embodiments, the cursor is visible as it moves along at least a portion of the trajectory. In some embodiments, the cursor moves essentially instantaneously from the first location to the second location.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM), field-programmable gate array (FPGA), application specific integrated circuit (ASIC) or other non-volatile memory device or devices, and the like. The executable instructions stored on the non-transitory computer readable storage medium may be in source code, assembly language code, object code, hardware description language (HDL) or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system FPGA, ASIC, RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   tracking, by a processing unit, a gaze location of a first user's eyes based on images captured by a user-facing camera;
   filtering, by the processing unit, movements of the first user's eyes based on one or more of angular velocity and divergent movement of one eye relative to the other eye to identify saccadic or vergence eye movements;
   computing, by the processing unit, the gaze location relative to a location of a cursor at a first display; and
   selectively moving, by the processing unit, the cursor from a first location to a second location along a trajectory in response to detecting that the first user's gaze is focused at a focal region comprising the second location following a saccadic or vergence eye movement.

2. The method of claim 1, wherein the cursor is visible as it moves along at least a portion of the trajectory.

3. The method of claim 1, wherein selectively moving comprises moving the cursor essentially instantaneously from the first location to the second location.

4. The method of claim 1, further comprising moving the cursor along the trajectory at a first rate for a first duration, and decelerating the cursor relative to the first rate as the cursor approaches the second location.

5. The method of claim 1, wherein the first location is at a first display and the second location is at a second display and selectively moving the cursor comprises transferring the cursor from the first display to the second display along the trajectory.

6. The method of claim 5, wherein the first display and the second display are controlled by different processing units.

7. The method of claim 1, wherein moving the cursor is further in response to detecting a signal generated at one of a mouse, keyboard, joystick, touchpad, or microphone, the signal indicating that the cursor should be moved to the second location.

8. The method of claim 1, further comprising refraining from moving the cursor to the second location in response to determining that the cursor is within a threshold distance of the second location.

9. The method of claim 1, further comprising selectively moving, by the processing unit, one or more of a function, icon, text, or graphic associated with the cursor from the first location to the second location in response to detecting that the first user's gaze is focused at a focal region comprising the second location following a purposeful saccadic movement.

10. A method, comprising:
tracking, by a processing unit, a gaze location of a first user's eyes based on images captured by a user-facing camera;
filtering, by the processing unit, movements of the first user's eyes based on one or more of angular velocity and divergent movement of one eye relative to the other eye to identify saccadic or vergence eye movements;
computing, by the processing unit, the gaze location relative to a location of a cursor at a first display;
receiving, at the processing unit, a signal indicating that the first user desires to move the cursor from a first location at the first display; and
moving the cursor from the first location to a second location along a trajectory in response to detecting that the first user's gaze is focused at a focal region comprising the second location following a saccadic or vergence eye movement.

11. The method of claim 10, wherein cursor is visible as it moves along at least a portion of the trajectory.

12. The method of claim 10, further comprising moving the cursor along the trajectory at a first rate for a first duration, and decelerating the cursor relative to the first rate as the cursor approaches the second location.

13. The method of claim 10, wherein the first location is at a first display and the second location is at a second display and moving the cursor comprises transferring the cursor from the first display to the second display along the trajectory.

14. The method of claim 13, wherein the first display and the second display are controlled by different processing units.

15. The method of claim 10, wherein moving the cursor is further in response to detecting a saccadic movement of the first user's eyes toward the second location.

16. The method of claim 10, wherein the signal is generated at one of a mouse, keyboard, joystick, touchpad, switch, or microphone.

17. The method of claim 10, further comprising selectively moving, by the processing unit, one or more of a function, icon, text, or graphic associated with the cursor from the first location to the second location in response to detecting that the first user's gaze is focused at a focal region comprising the second location.

18. An electronic device, comprising:
a user-facing camera configured to track a gaze of a first user's eyes;
a first display;
a cursor displayed at a first location at the first display; and
a processor configured to:
filter movements of the first user's eyes based on one or more of angular velocity and divergent movement of one eye relative to the other eye to identify saccadic or vergence eye movements; and
selectively move the cursor from the first location to a second location along a trajectory in response to receiving a signal indicating that the first user desires to move the cursor from the first location and further in response to detecting that the first user's gaze is focused at a focal region comprising the second location following a saccadic or vergence eye movement.

19. The electronic device of claim 18, wherein cursor is visible as it approaches the second location.

20. The electronic device of claim 18, wherein the second location is at a second display and the processor is configured to selectively move the cursor by transferring the cursor from the first display to the second display along the trajectory.

21. The electronic device of claim 20, wherein the first display and the second display are controlled by different processing units.

* * * * *